June 11, 1968     C. J. YARROW     3,388,315
EXCITATION CIRCUITS FOR SELF-EXCITED ALTERNATING CURRENT GENERATORS
Filed March 21, 1966     2 Sheets-Sheet 1

APPLICANT
Christopher John Yarrow
BY
Misegades & Douglas
ATTORNEYS

United States Patent Office 3,388,315
Patented June 11, 1968

3,388,315
EXCITATION CIRCUITS FOR SELF-EXCITED
ALTERNATING CURRENT GENERATORS
Christopher John Yarrow, Bradford, England, assignor to
The English Electric Company Limited, London, England, a British company
Filed Mar. 21, 1966, Ser. No. 535,920
Claims priority, application Great Britain, Mar. 22, 1965,
12,076/65
10 Claims. (Cl. 322—25)

ABSTRACT OF THE DISCLOSURE

An excitation circuit which is associated with the output of a self-excited alternating current generator for deriving both voltage dependent excitation and, through one or more current transformers, current dependent excitation for the generator field winding, in which impedance for reducing the voltage dependent excitation to an acceptable level is provided by the current transformers.

This invention relates to field excitation circuits for self-excited alternating current generators.

According to one aspect of the invention, a direct current field excitation circuit for a self-excited alternating current generator of the kind in which generator load current dependant excitation is provided for the generator field from a rectifier network connected to current transformer means associated with the generator output circuit, and in which generator output voltage dependant excitation is also provided for the generator field from the generator output through said rectifier network with series impedance means connected between the rectifier network and the generator output circuit for reducing the voltage dependant excitation to a desired value, has the impedance means constituted by one or more windings of the current transformer means.

According to a preferred feature of the invention, for each phase of the generator output there is provided a current transformer having its primary winding connected in series with the generator output and its secondary winding coupled to the generator output and to the rectifier network so as to supply to the rectifier network both an alternating current voltage and an alternating current for the voltage and current dependant excitation for the generator field.

The secondary winding of the reach current transformer may be connected directly between the generator output and the rectifier network, or it may be coupled to the generator output in such a way as to supply voltage excitation of the generator field at a voltage less than the output voltage of the generator.

Such coupling may be through a tapping on the respective phase of the generator armature winding or it may be through a step down voltage transformer.

According to a second aspect of the invention there is provided controllable by-pass means in parallel with the generator field for providing a controllable current path which is alternative to the current path provided by the generator field, whereby the current flowing in the generator field may be controlled.

Figure 1:
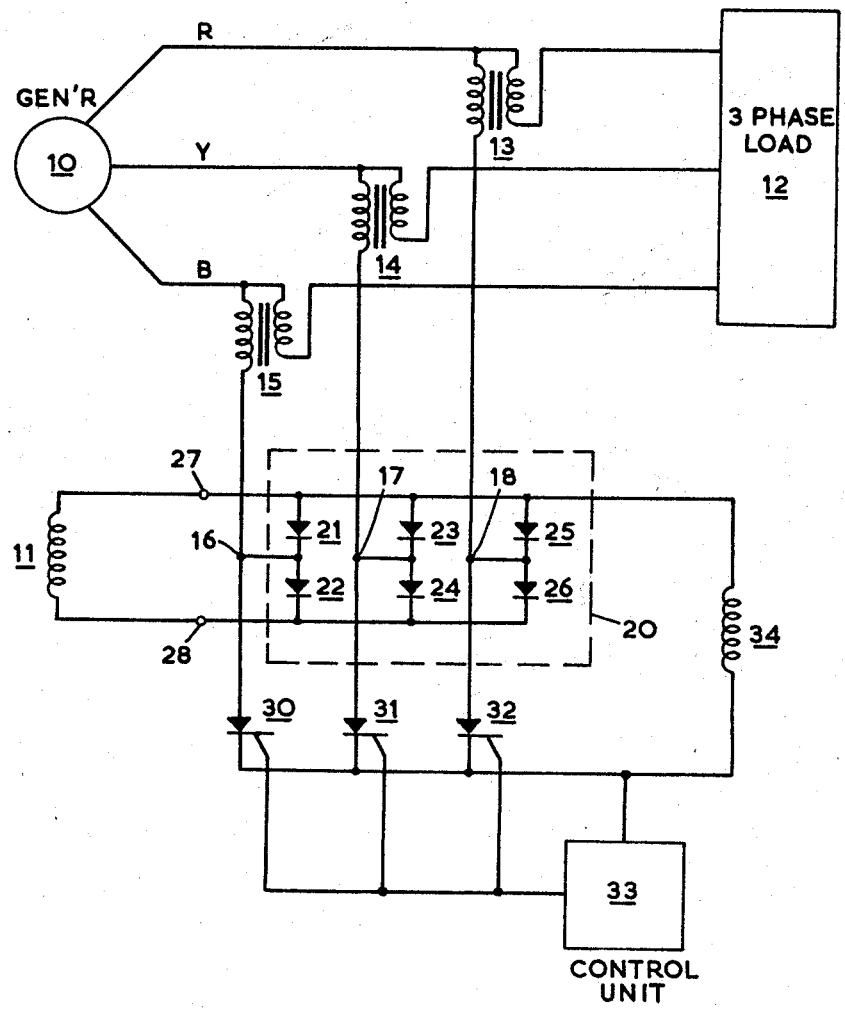
Figure 2:
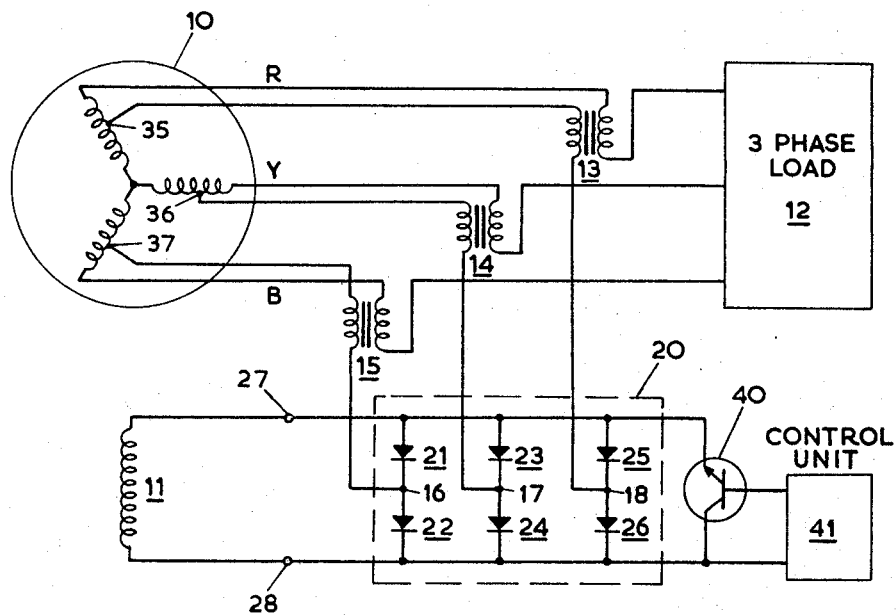
Figure 3:
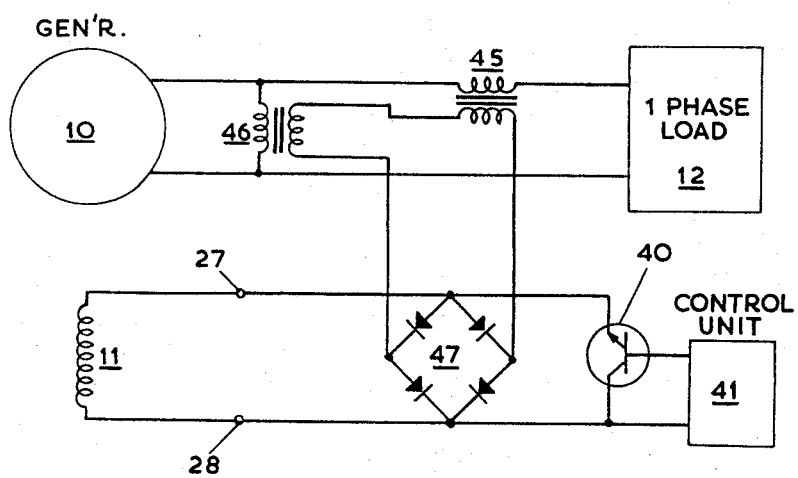

In order that the invention may be more fully understood, three field excitation circuits in accordance with the invention will now be described, by way of example, with reference to the accompanying drawings, in which:

FIG. 1 shows the first excitation circuit;
FIG. 2 shows the second excitation circuit; and
FIG. 3 shows the third excitation circuit.

Referring now to FIG. 1, there is shown an alternating current generator 10 arranged to supply a three phase load 12 through a load line having red, yellow, and blue phases. The generator field winding is shown at 11.

Associated with each phase line is one of three current transformers 13, 14, or 15, the primary winding of each transformer being connected in series with its associated line and one end of the secondary winding of each transformer being electrically connected to its associated line as shown.

The other end of each current transformer secondary winding is connected to one of the A.C. terminals 16, 17, 18, of a three phase rectifier bridge 20 which is comprised of six diodes 21 to 26 and has the field winding 11 of the generator connected across its D.C. terminals 27 and 28.

Connected to respective ones of the A.C. terminals of the rectifier bridge are the anodes of three controllable rectifiers 30, 31 and 32 which have their control electrodes connected to a control unit 33 and have their cathodes connected to the control unit 33 and to one terminal connection of a by-pass impedance 34 the other end of which is connected to the terminal 27 of the rectifier bridge 20.

The excitation circuit shown provides for excitation of the generator field 11 under both normal and short-circuit conditions of operation as is now to be described.

During no load operation of the generator the excitation supplied is wholly voltage dependant and is derived from the phase voltages of the line, one path for the flow of excitation current being, for instance, from the red line to the blue line via the secondary winding of current transformer 13, the diode 26, the field winding 11, the diode 21, and thence to the blue line via the secondary winding of current transformer 15.

When the generator is on load, the voltage dependant excitation is augmented by additional current dependant excitation which is supplied by transformer action of the current transformers 13, 14, and 15, the voltage induced in the secondaries of the latter due to the flow of load current in their primaries being superimposed on the voltage dependant excitation provided as described above. By thus providing additional load current dependant excitation the effects of regulation of the generator on load are counteracted.

During short circuit conditions of generator operation, the generator output voltage falls to a low value, and the high level of excitation which must be provided to operate circuit breakers or blow fuses associated with the generator is substantially all provided by the current dependant excitation circuit.

This high level of excitation needed for short circuit conditions however, requires that the current transformers have such a turns ratio that the current dependant excitation they produce under normal conditions of operation would be excessive.

To reduce the excitation provided under normal conditions of operation, a by-pass circuit which comprises the by-pass impedance 34, the controllable rectifiers 30, 31 and 32 and control unit 33 is provided. Under normal conditions the controllable rectifiers are controlled by the control unit 33 to conduct over part, or the whole, of the half cycle of forward voltage applied to them so that a path is provided for current flow through the by-pass impedance 34 which is alternative to the path provided by the alternator field 11, and the current in the generator field is therefore reduced to the required value.

During short circuit conditions of generator operation, when the full excitation available from the current dependant excitation circuit is required, the controllable rectifiers are made non-conducting and no current flows in the by-pass impedance 34.

It will be noted that the secondary windings of the current transformers 13, 14 and 15 have a voltage induced in them only during on load and short circuit conditions of generator operation. During all conditions of operation, however, they act as fixed series impedances in the circuit by which the voltage dependant excitation for the generator field 11 is derived from the phase voltages. If no series impedance was provided in this voltage circuit, then under no load or normal conditions of operation of the generator the voltage dependant excitation provided would be excessive because generators of this type are required to generate at a high output voltage.

In this embodiment, as in the further embodiments and variations a description of which is to follow, the reluctance of the magnetic circuits of the current transformers is chosen so that the current transformer secondary windings have a desired impedance. In this way the voltage reduction provided by each of these series impedances may be set at a desired value.

In the circuit shown in FIG. 1 the controllable rectifiers 30, 31, and 32 are preferably silicon controlled rectifiers, but alternately other devices such as thyratrons may be used.

FIG. 2 shows the second excitation circuit to be similar to the circuit of FIG. 1 in several respect and like reference in FIGS. 1 and 2 therefore indicate similar parts.

In FIG. 2, a three phase alternating current generator 10 having a direct current field winding 11 supplies a load 12 through a load line having red, yellow and blue phases. Respectively associated with these three phases of the line are current transformers 13, 14 and 15, the secondary windings of which each have one of their ends connected part way along the respective armature phase windings of the generator 10 at tapping points indicated at 35, 36 and 37.

The other ends of the current transformer secondary windings are connected to a three phase rectifier bridge 20 arranged, as in FIG. 1, to supply the generator field winding 11 from its direct current terminals 27, 28.

A by-pass transistor 40 has its emitter and collector electrodes connected across the direct current output of the rectifier bridge 20 and is controlled, as is later to be described, by signals applied to its base electrode from a control unit 41.

The excitation circuit of FIG. 2 operates to provide both voltage dependant excitation and current dependant excitation to the field winding 11 and is basically similar in operation to the circuit of FIG. 1, the magnetising inductances of the current transformer secondary windings again being used to reduce the voltage dependant excitation. However, in the excitation circuit of FIG. 2 only a part of each generator armature winding is used to provide voltage dependant excitation so that the proportion of the generator output voltage used for excitation can be even less than that of the circuit of FIG. 1.

It will be appreciated that a required level of voltage dependant excitation is achieved by suitable choice of the positions of the tappings 35, 36 and 37 on their respective armature windings and by choice of the reluctance of the magnetic circuits of the current transformers.

If desired, one or more tappings additional to the tapping 35, 36 or 37 may be provided on each of the armature windings so that voltage dependant excitation may be adjusted to suit different conditions of generator operation.

The transistor 40 operates to provide a circuit which can be controlled by the control unit 41 to by-pass the field winding 11 and thereby to control the excitation provided to the winding. Thus the transistor 40 has the same function in the excitation circuit of FIG. 2 as the rectifiers 30, 31 and 32 with the by-pass impedance 34 in the excitation circuit of FIG. 1.

Referring now to FIG. 3, a single phase alternating current generator 10 supplies a load 12 through a two wire load line having a current transformer 45 associated with one of the wires.

Connected across the generator output is the primary winding of a step down voltage transformer 46 and the secondary winding of this voltage transformer is connected in series with the secondary winding of the current transformer 45 across a single phase rectifier bridge which is indicated generally at 47.

Across the direct current output of this rectifier bridge 47 are connected the generator field winding 11 and a by-pass transistor 40 in a similar arrangement to that already described with respect to FIG. 2.

Operation of the excitation circuit of FIG. 3 is basically the same as that of the two circuits previously described.

Reduction of the level of the voltage dependant excitation beyond that provided by the magnetising inductance of the secondary winding of the current transformer 45 is provided in this embodiment of the invention by the step down voltage transformer 46; and the turns ratio of this transformer 46 is suitably chosen to give the required level of excitation.

It will be appreciated that the use of step down voltage transformers is not limited to excitation circuits for single phase alternating current generators, such as is shown in FIG. 3. Three such transformers having their primary windings connected between the respective phase lines and the star point of the armature windings may be provided in a three phase generator excitation circuit such as is shown in FIG. 2 instead of the tapped arrangement of the armature windings shown.

In a similar way, the tapped arrangement of an armature winding is not limited to excitation circuits for three phase alternating current generators. A single phase generator may similarly be arranged to supply voltage dependant excitation from only part of its armature winding.

In addition, although FIG. 3 shows an excitation circuit for a single phase alternating current generator to be such that only a proportion of the generator output voltage is used to provide voltage dependant excitation, if desired the whole output voltage can be used to provide such excitation, that is, through the impedance provided by the current transformer secondary winding.

Whilst the invention has been described in relation to a three phase excitation circuit of a three phase alternating current generator, it could equally as well be applied to a single or two phase excitation circuit for such a generator.

The invention may also be applied to an excitation circuit having a number of phases greater than three, such as might be used for a five phase brushless direct current generator.

The drawings show each current transformer to have its secondary winding connected or coupled to the phase of the generator output with which its primary winding is associated. If desired, an excitation circuit for a multiphase generator may include a current transformer having its primary winding associated with one phase of the generator output and having its secondary winding coupled to another phase or to a combination of phases, or connected to another phase, of the generator output.

I claim:

1. In or for a self-excited alternating current generator of the kind having field winding means excited by current dependant excitation proportional to current flowing in the output circuit of the generator and also excited by voltage dependent excitation proportional to the generator output voltage, a direct current excitation circuit for said generator field winding means comprising in combination, rectifier means having said field winding means connected across the direct current output thereof, current transformer means associated with said generator output circuit and having output winding means connected to the input of the rectifier means for providing said current dependant excitation to said field winding means through said rectifier means, and means for providing the said voltage dependent excitation to said field winding means through said rectifier means with impedance means connected in circuit relationship between the generator output circuit and the rectifier means for reducing the voltage dependent excitation, said impedance means being constituted by the said output winding means of the current transformer means.

2. A field circuit according to claim 1 in which the current transformer means is constituted by one current transformer to each phase of the generator output, each said current transformer having its primary winding connected in series with the respective phase of the generator output circuit and having its secondary winding connected in circuit relationship with the respective phase of the generator output circuit.

3. A field excitation circuit according to claim 2 in which the secondary winding of each current transformer is connected directly between the generator output circuit and the rectifier means.

4. A field excitation circuit according to claim 2 having tapping means provided on each phase of the generator armature winding, the secondary winding of the respective current transformer being connected to the generator output circuit at said tapping means.

5. A field excitation circuit according to claim 2 in which, for each phase of the generator output, there is provided a step down voltage transformer having its primary winding connected across a phase of the generator output circuit and having its secondary winding in series with the secondary winding of the current transformer associated with the said phase of the generator output circuit.

6. A field excitation circuit according to claim 1 for a multiphase alternating current generator, in which the current transformer means includes a current transformer having its primary winding connected in series with a first phase of the generator output circuit and having its secondary winding connected in circuit relationship with a second phase of the generator output circuit.

7. A field excitation circuit according to claim 1 for a multiphase alternating current generator, in which the current transformer means includes a current transformer having its primary winding connected in series with a first phase of the generator output circuit, and having its secondary winding connected in circuit relationship with both a second phase and a third phase of the generator output circuit.

8. A field excitation circuit according to claim 1 having controllable by-pass means in parallel with the generator field winding means for providing a controllable current path which is alternative to the current path provided by the generator field winding means.

9. A field excitation circuit according to claim 8 in which the by-pass means includes, in combination, at least one controllable rectifier and an impedance connected in series therewith.

10. A field excitation circuit according to claim 8 in which the by-pass means includes a transistor having its collector-emitter path in parallel with the field winding means.

References Cited

UNITED STATES PATENTS

| | | | |
|---|---|---|---|
| 2,958,034 | 10/1960 | Hobbs | 322—25 |
| 3,030,568 | 4/1962 | Soichi Oda et al. | 322—25 |
| 3,211,987 | 10/1965 | Gatlin et al. | 322—59 X |
| 3,249,847 | 5/1966 | Hartman et al. | 322—25 X |
| 3,254,293 | 5/1966 | Steinbruegg et al. | 322—73 |
| 3,299,342 | 1/1967 | Rath | 322—28 |

MILTON O. HIRSHFIELD, *Primary Examiner.*

J. D. TRAMMELL, *Assistant Examiner.*